US012287609B2

(12) United States Patent
Chabloz

(10) Patent No.: US 12,287,609 B2
(45) Date of Patent: Apr. 29, 2025

(54) METHOD FOR ADJUSTMENT OF A FLEXUTE PIVOT TIMEPIECE OSCILLATOR

(71) Applicant: PATEK PHILIPPE SA GENEVE, Geneva (CH)

(72) Inventor: David Chabloz, Cranves-Sales (FR)

(73) Assignee: PATEK PHILIPPE SA GENEVE, Geneva (CH)

(*) Notice: Subject to any disclaimer, the term of this patent is extended or adjusted under 35 U.S.C. 154(b) by 543 days.

(21) Appl. No.: 17/626,303

(22) PCT Filed: Jul. 7, 2020

(86) PCT No.: PCT/IB2020/056370
§ 371 (c)(1),
(2) Date: Jan. 11, 2022

(87) PCT Pub. No.: WO2021/009613
PCT Pub. Date: Jan. 21, 2021

(65) Prior Publication Data

US 2022/0317628 A1 Oct. 6, 2022

(30) Foreign Application Priority Data

Jul. 12, 2019 (EP) .................................... 19185980

(51) Int. Cl.

| | |
|---|---|
| ***G04B 17/20*** | (2006.01) |
| ***G04B 17/04*** | (2006.01) |
| ***G04B 17/06*** | (2006.01) |

(52) U.S. Cl.
CPC ........... *G04B 17/20* (2013.01); *G04B 17/045* (2013.01); *G04B 17/063* (2013.01)

(58) Field of Classification Search
None
See application file for complete search history.

(56) References Cited

U.S. PATENT DOCUMENTS

| | | | |
|---|---|---|---|
| 9,836,024 | B2 | 12/2017 | Di Domenico et al. |
| 10,359,737 | B2 | 7/2019 | Maier |

(Continued)

FOREIGN PATENT DOCUMENTS

| | | |
|---|---|---|
| CN | 105717777 A | 6/2016 |
| EP | 2 796 944 | 10/2014 |

(Continued)

OTHER PUBLICATIONS

Translation of EP3416001, Espacenet (Year: 2024).*

(Continued)

*Primary Examiner* — Renee S Luebke
*Assistant Examiner* — Matthew Daniel Hwang
(74) *Attorney, Agent, or Firm* — NIXON & VANDERHYE

(57) ABSTRACT

Disclosed is an adjustment method for a timepiece oscillator including a balance, a support and a flexure pivot connecting the balance to the support and guiding the balance in rotation as to the support about a virtual axis of rotation, the flexure pivot having, in orthogonal projection in a plane perpendicular to the virtual axis of rotation, an axis of symmetry which is also an axis of symmetry for the points where the flexure pivot joins the balance. In the method, the unbalance of the balance is adjusted so, in orthogonal projection in the plane, the center of mass of the balance is substantially on the axis of symmetry and at a position distinct from that of the virtual axis of rotation and chosen to reduce, and preferably render minimal, the dependency of the oscillation frequency with respect to the orientation of gravity for a predetermined amplitude of oscillation.

20 Claims, 6 Drawing Sheets

(56) References Cited

U.S. PATENT DOCUMENTS

| | | | | |
|---|---|---|---|---|
| 2013/0272100 | A1 | 10/2013 | Verardo | |
| 2015/0234354 | A1* | 8/2015 | Henein | G04B 17/045 368/170 |
| 2016/0179058 | A1 | 6/2016 | Born et al. | |
| 2017/0010586 | A1 | 1/2017 | Di Domenico et al. | |
| 2018/0143591 | A1* | 5/2018 | Di Domenico | B81C 1/00603 |
| 2018/0284695 | A1 | 10/2018 | Maier | |
| 2019/0064741 | A1 | 2/2019 | Di Domenico et al. | |
| 2019/0064742 | A1* | 2/2019 | Di Domenico | G04B 17/28 |

FOREIGN PATENT DOCUMENTS

| | | | | |
|---|---|---|---|---|
| EP | 2 911 012 | | 8/2015 | |
| EP | 3 035 126 | A1 | 6/2016 | |
| EP | 3 382 470 | | 10/2018 | |
| EP | 3 435 170 | | 10/2018 | |
| EP | 3416001 | A1 * | 12/2018 | G04B 17/045 |
| EP | 3 451 073 | | 3/2019 | |
| EP | 3 451 074 | A2 | 3/2019 | |
| JP | 2013542402 | A | 11/2013 | |
| JP | 2014160037 | A | 9/2014 | |
| JP | 2017503155 | A | 1/2017 | |
| JP | 2018535431 | A | 11/2018 | |
| WO | 2016096677 | A1 | 6/2016 | |
| WO | 2017/055983 | | 4/2017 | |
| WO | 2018/095592 | | 5/2018 | |
| WO | 2018/095997 | | 5/2018 | |

OTHER PUBLICATIONS

International Search Report for PCT/IB2020/056370 dated Aug. 27, 2020, 4 pages.

Written Opinion of the ISA for PCT/IB2020/056370 dated Aug. 27, 2020, 7 pages.

Wittrick, "The Properties of Crossed Flexure Pivots, and the Influence of the Point at which the Strips Cross", *The Aeronaturical Quarterly*, vol. 11, Feb. 1951, pp. 272-292.

Office Action, issued in Japanese Patent Application No. 2022-500954 dated Jun. 20, 2024.

* cited by examiner

METHOD FOR ADJUSTMENT OF A FLEXUTE PIVOT TIMEPIECE OSCILLATOR

CROSS-REFERENCE TO THE RELATED APPLICATIONS

This application is the U.S. national phase of International Application No. PCT/IB2020/056370 filed Jul. 7, 2020 which designated the U.S. and claims priority to EP Patent Application No. 19185980.0 filed Jul. 12, 2019, the entire contents of each of which are hereby incorporated by reference.

BACKGROUND OF THE INVENTION

Field of the Invention

The present invention relates to a timepiece oscillator able to serve as a time base in a mechanical timepiece movement.

More precisely, the present invention relates to a flexure pivot timepiece oscillator, i.e. a timepiece oscillator with no physical rotational spindle turning in bearings. Such an oscillator pivots about a virtual axis of rotation by virtue of an arrangement of elastic parts.

Description of the Related Art

Different types of flexure pivots exist, such as pivots with separate crossed strips, pivots with non-separate crossed strips or pivots with a remote centre of rotation, named "RCC" (Remote Centre Compliance). In a pivot with separate crossed strips, the strips extend in two parallel planes so as to cross each other without contact. In a pivot with non-separate crossed strips, they extend in the same plane so as to cross each other physically. As for the pivot with a remote centre of rotation, it comprises two strips which do not cross each other but which extend along axes which do cross each other. In all cases, the crossing of the strips or of their axes defines the virtual axis of rotation.

As for any timepiece oscillator, it is important that a flexure pivot timepiece oscillator has low sensitivity to gravity or, in other words, that its frequency varies as little as possible according to its orientation with respect to the force of gravity.

With this aim, it is possible to play on the position of the crossing point of the strips or of their axes. For example, in the context of an oscillator with separate crossed strips, patent application EP 2911012 proposes arranging the elastic strips so that their crossing point is located at ⅞ths of their length according to the theory developed by W. H. Wittrick in the article "The properties of crossed flexure pivots and the influence of the point at which the strips cross", The Aeronautical Quarterly, vol. II, February 1951, the theoretical value in fact being $\frac{1}{2}+\sqrt{5}/6$, i.e. about 87.3% of the length. This position for the crossing point is indeed the position which minimises the stray displacements of the virtual axis of rotation and thus the dependency of the frequency of the oscillator with respect to gravity.

In reality, it appears that the choice of a particular position for the crossing point minimises the dependency of the frequency with respect to gravity only for a certain amplitude of oscillation which is about 12° for an oscillator with separate crossed strips. For other amplitudes of oscillation, in particular larger amplitudes, the variation in frequency according to the position of the watch with respect to gravity can be considerable.

SUMMARY OF THE INVENTION

The present invention aims to propose a new way of improving the precision of operation of a flexure pivot timepiece oscillator, which may or may not be combined with that consisting of choosing a particular position for the crossing point of the strips or of their axes.

To this end, a method is provided for adjustment of a timepiece oscillator comprising a balance, a support and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for the points where the flexure pivot is joined to the balance, characterised in that the unbalance of the balance is adjusted so that, in orthogonal projection in said plane, the centre of mass of the balance is substantially on the axis of symmetry and at a position distinct from that of the virtual axis of rotation, said position being chosen so as to reduce, and preferably render minimal, the dependency of the oscillation frequency with respect to the orientation of gravity for a predetermined amplitude of oscillation.

The present invention also relates to a timepiece oscillator which can be adjusted by the method as defined above.

The applicant discovered that a correlation exists between the amplitude of oscillation, the position of the centre of mass of the balance and the sensitivity of the oscillator to gravity. Starting with a given amplitude of oscillation, it is possible to find a position for the centre of mass of the balance along the axis of symmetry of the flexure pivot which minimises the difference in rate between the different vertical positions of the oscillator with respect to the force of gravity. It is thus possible, by the adjustment in accordance with the invention, to obtain a timepiece oscillator with performance at least equivalent to that of an oscillator of the Wittrick type and operating at a different amplitude, more suited to the characteristics of the movement in which it is intended to be used.

BRIEF DESCRIPTION OF THE DRAWINGS

Other features and advantages of the present invention will become clear upon reading the following detailed description given with reference to the attached drawings in which.

DESCRIPTION OF THE PREFERRED EMBODIMENTS

Throughout what follows, the geometric and dimensional characteristics of the timepiece oscillator are defined with reference to its rest position.

Figure 1:
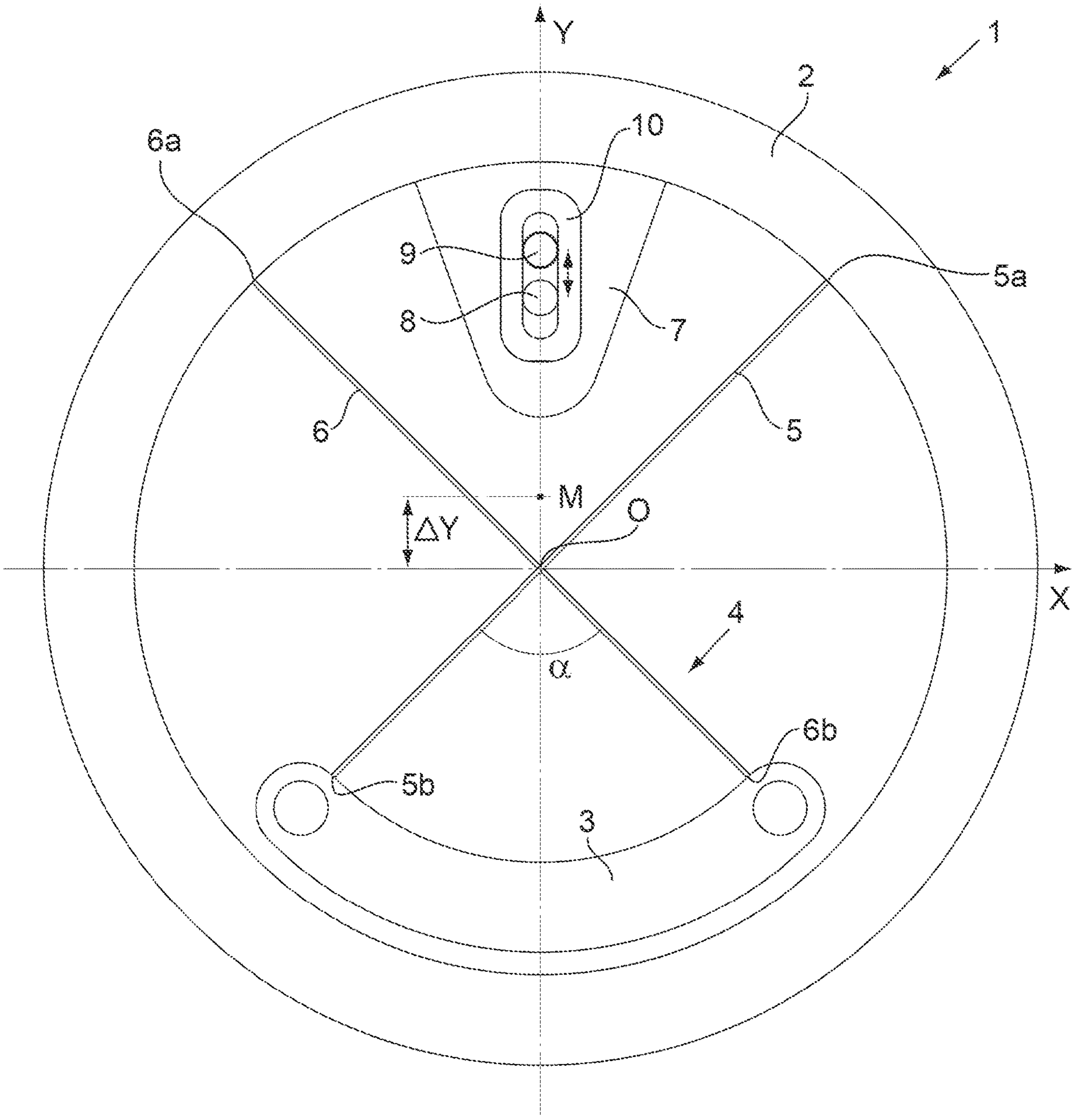
FIGS. 1 and 2 are respectively a plan view from above and a perspective view of a flexure pivot timepiece oscillator according to a particular embodiment of the invention.
Figure 2:
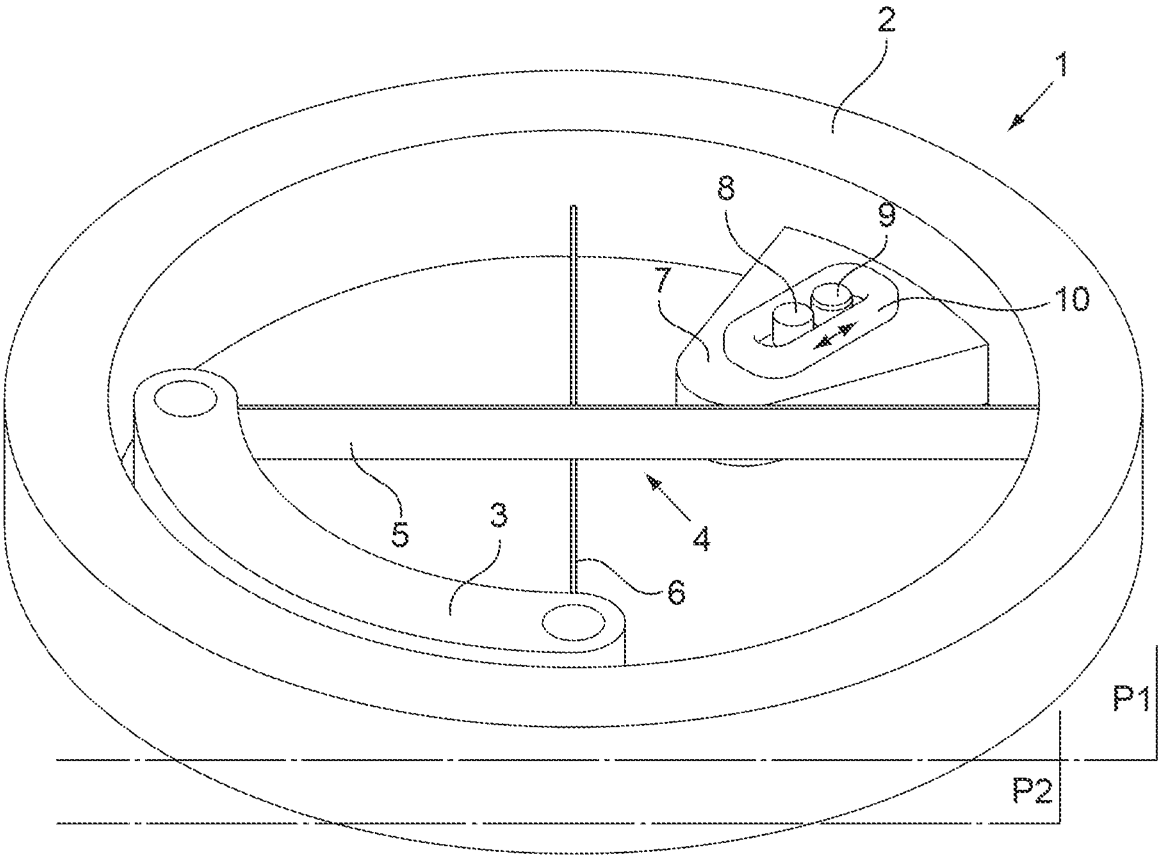

FIGS. 1 and 2 show a flexure pivot timepiece oscillator according to one particular embodiment of the invention, intended to fulfil the function of a balance-hairspring in a mechanical timepiece movement, in particular a wrist watch or pocket watch movement. This oscillator, designated by 1, comprises an oscillating body or balance 2, a support 3 and a flexure pivot 4. The support 3 is intended to be fixed to a fixed or movable frame of the movement. The flexure pivot 4 is here in the form of two elastic strips 5, 6 extending in respective parallel planes P1, P2 and crossing without contact. Each of these strips 5, 6 is joined at one end 5*a*, 6*a* to the balance 2 and at its other end 5*b*, 6*b* to the support 3. The balance 2 is thus held on the support 3 only by the flexure pivot 4 which guides it in rotation with respect to the support 3 about a virtual axis of rotation and returns it elastically to a rest position, i.e. the position illustrated in FIGS. 1 and 2. The virtual axis of rotation extends perpendicularly to the planes P1, P2 and corresponds, in orthogonal projection in either one of these planes P1, P2 (cf. FIG. 1), to the point O of crossing between the strips 5, 6, more precisely to the point of crossing between the neutral axes of these strips. In FIG. 1, the crossing point O is the centre of a guide-mark (O, X, Y) of which the axis Y is an axis of symmetry for the strips 5, 6, this axis of symmetry passing between the points 5*a*, 6*a* where the strips 5, 6 are joined to the balance 2 and between the points 5*b*, 6*b* where the strips 5, 6 are joined to the support 3. In the illustrated example, the balance 2 is in the form of a ring surrounding the flexure pivot 4. As a variant, it could be of the cut type.

Figure 3:
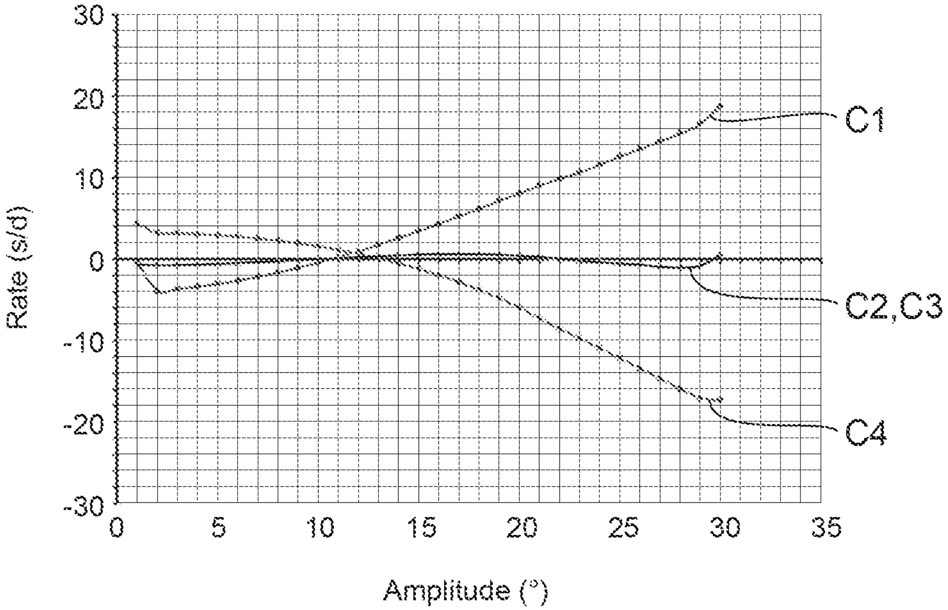
FIGS. 3 to 5 are diagrams showing the rate of flexure pivot oscillators according to the amplitude of oscillation and the orientation of the oscillator with respect to gravity.

FIG. 3 shows the rate of the oscillator 1 according to its amplitude of oscillation and its orientation with respect to the force of gravity for a crossing point O of the strips 5, 6 which is located at 87.3% of their length, i.e. at the optimal position proposed by W. H. Wittrick. This position for the crossing point O is measured from the points 5*a*, 6*a* where the strips 5, 6 are joined to the balance 2 but can, in a variant, be measured from the points 5*b*, 6*b* where the strips 5, 6 are joined to the support 3, the crossing point O being equally able to be located on the side where the support 3 is or where the balance 2 is. The simulation result of FIG. 3 has, furthermore, been obtained with a balanced balance 2, the centre of mass of which coincides with the crossing point O in orthogonal projection in either one of the planes P1, P2. Moreover, the angle $\alpha$ between the strips 5, 6 has been selected to be an angle of 71° within the range of 68° to 76° which minimises anisochronism owing to the non-linearity of the elastic moment produced by the flexure pivot 4 according to the teaching of patent application WO 2016/096677. Thus the simulation, the result of which is shown in FIG. 3, was carried out under the optimal conditions described in the prior art.

The diagram of FIG. 3 shows the rate in seconds/day on the y axis and the amplitude of oscillation in degrees on the x axis. The four curves C1 to C4 correspond respectively to four vertical positions of the oscillator spaced apart by 90°. In these four vertical positions respectively, the force of gravity is directed along the half axis (O, −Y), the half axis (O, X), the half axis (O, −X) and the half axis (O, Y). The curves C2 and C3 coincide due to the symmetry of the oscillator with respect to the axis Y. It will be noted that the difference in rate between these vertical positions is minimal for an amplitude of oscillation of about 12° and that it is high for greater amplitudes, in particular for the amplitude of 30°, which means that at large amplitudes the oscillation frequency depends quite strongly on the orientation of the oscillator with respect to gravity. However, while small amplitudes have the advantage of attenuating the effect of the non-linearity of the elastic return moment on isochronism, they also have disadvantages. In particular, they make it more difficult, or even impossible, to maintain oscillations using a conventional escapement such as a Swiss lever escapement. It may thus be desirable to increase the amplitude of oscillation up to values of e.g. 25° or 30°.

Figure 4:
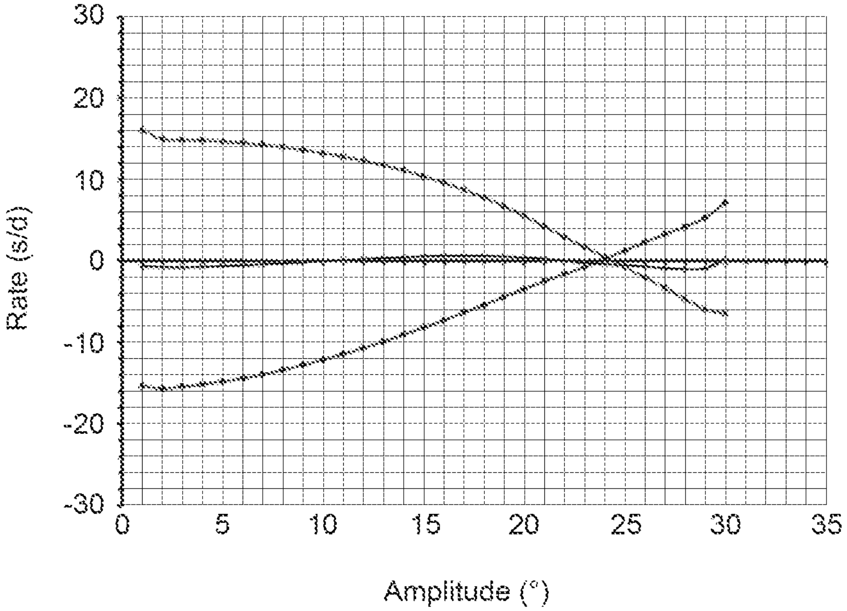
Figure 5:
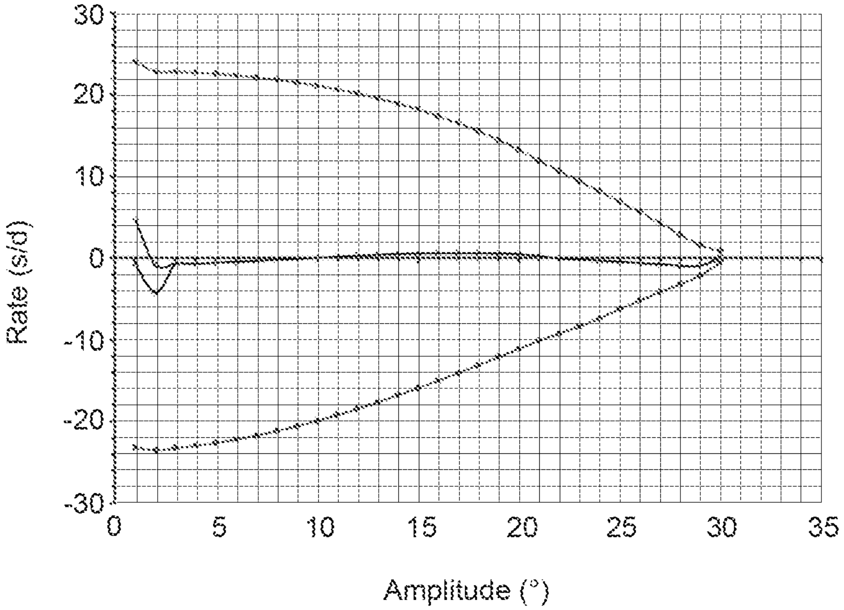

In order to increase the amplitude of oscillation without degrading performance in terms of sensitivity to gravity, the invention makes provision to imbalance the balance 2 so that its centre of mass M is distinct from the crossing point O of the strips 5, 6 and thus from the centre of rotation of the balance 2 in orthogonal projection in either one of the planes P1, P2. It is indeed observed that shifting the centre of mass M on the axis Y from the point O modifies the amplitude of oscillation for which the difference in rate between the different vertical positions of the oscillator is minimal. This is illustrated in FIGS. 4 and 5 which have been obtained with the same parameters as for FIG. 3 but with a centre of mass M of the balance 2 located on the axis Y at a distance ΔY from the point O equal to 30 μm (corresponding to an unbalance of 15 nN·m) for FIG. 4, and at a distance ΔY from the point O equal to 50 μm (corresponding to an unbalance of 25 nN·m) for FIG. 5. In FIG. 4, the amplitude of oscillation at which the frequency is the least dependent upon the orientation of gravity is about 24°. In FIG. 5, it is about 30°. FIGS. 4 and 5 illustrate the effect of shifting the centre of mass M on the half axis (O, Y). Of course, it is possible to shift the centre of mass M on the half axis (O, −Y) if a reduction in the amplitude of oscillation is desired.

Figure 6:
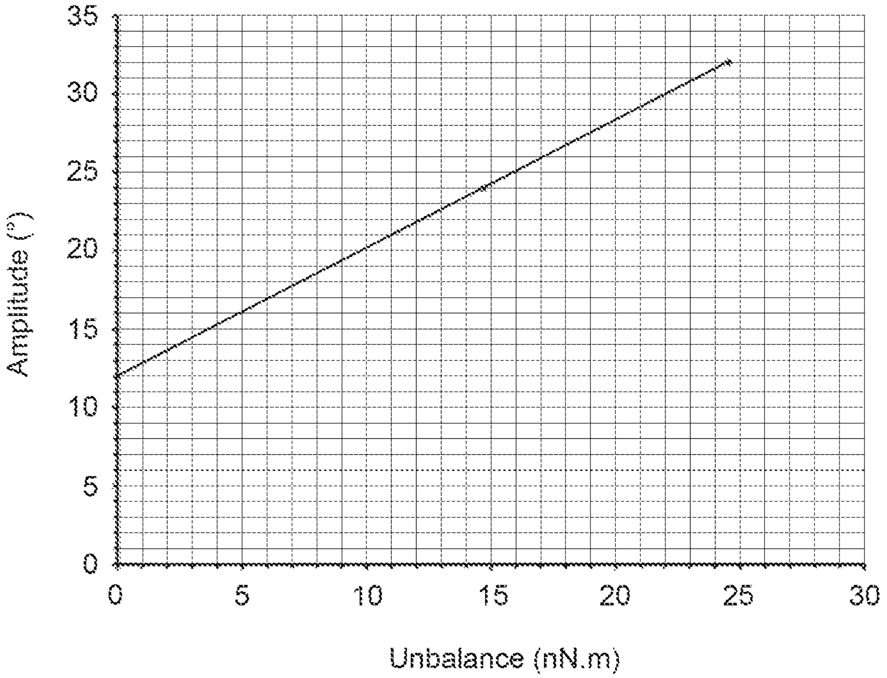
FIG. 6 is a diagram showing a relationship between the unbalance of the balance of the oscillator and the amplitude of oscillation, rendering minimal the difference in rate between the different vertical positions of the oscillator.

FIG. 6 shows the relationship between the amplitude of oscillation giving the minimum difference in rate between the four above-mentioned vertical positions of the oscillator 1 and the unbalance of the balance 2. It will be seen that for each amplitude of oscillation it is possible to find an unbalance, more precisely a position of the centre of mass M of the balance 2 on the axis Y, which corresponds thereto.

Generally speaking, in the invention, the distance ΔY between the centre of mass M of the balance 2 and the crossing point O is preferably at least 1.4 μm, more preferably at least 2 μm, more preferably at least 5 μm, more preferably at least 10 μm, more preferably at least 20 μm, more preferably at least 40 μm. The unbalance is preferably at least 0.7 nN·m, more preferably at least 1 nN·m, more preferably at least 2.5 nN·m, more preferably at least 5 nN·m, more preferably at least 10 nN·m, more preferably at least 20 nN·m, in absolute value.

In practice, after an amplitude of oscillation has been chosen, the unbalance of the balance 2 is adjusted in order to render minimal the difference in rate between the vertical positions at this amplitude of oscillation. The adjustment can be effected by removing material from the balance 2, e.g. by milling or laser cutting, or by adding material to the balance 2, e.g. by a deposition technique. Alternatively or cumulatively, the unbalance can be adjusted using an adjustment device carried by the balance 2.

An example of such an adjustment device is illustrated in FIGS. 1 and 2. It comprises a support 7 rigidly connected to the balance 2 and preferably forming one piece therewith. This support 7 extends radially from the inner face of the balance 2 facing the virtual axis of rotation. Two studs 8, 9 rigidly connected to the support 7 and preferably forming one piece therewith are surrounded by, and serve as guides for, a frame 10 able to move in translation with respect to the support 7 along the axis Y. At least one of the studs 8, 9 has a diameter larger than the internal width of the frame 10 in order to elastically deform its two large sides and thus hold it in position by elastic gripping. The application of a sufficient force to the frame 10 in the direction of the axis Y displaces the frame 10 in order to modify the unbalance of the balance 2. One or more recesses can be provided on the balance 2 in order to compensate for the imbalance caused by the support 7, the studs 8, 9 and the frame 10 in order that, in a specific position of the frame 10, e.g. a position in which it is in abutment against one of the two studs 8, 9, the unbalance of the balance 2 is substantially zero. A displacement of the frame 10 thus imbalances the balance 2 by shifting its centre of mass M along the axis Y from the point O, permitting precise adjustment of the unbalance.

The adjustment of the unbalance of the balance 2 modifies the moment of inertia of the balance. The balance 2 can thus also carry inertia-blocks which will serve to adjust the moment of inertia in a manner which is conventional per se.

As an alternative to the adjustment device 7-10 as illustrated, the balance 2 could carry on its periphery one or more adjustment screws, e.g. one or two screws oriented along the axis Y, the adjustment being effected by screwing more or less these screws into the balance 2.

Figure 7:
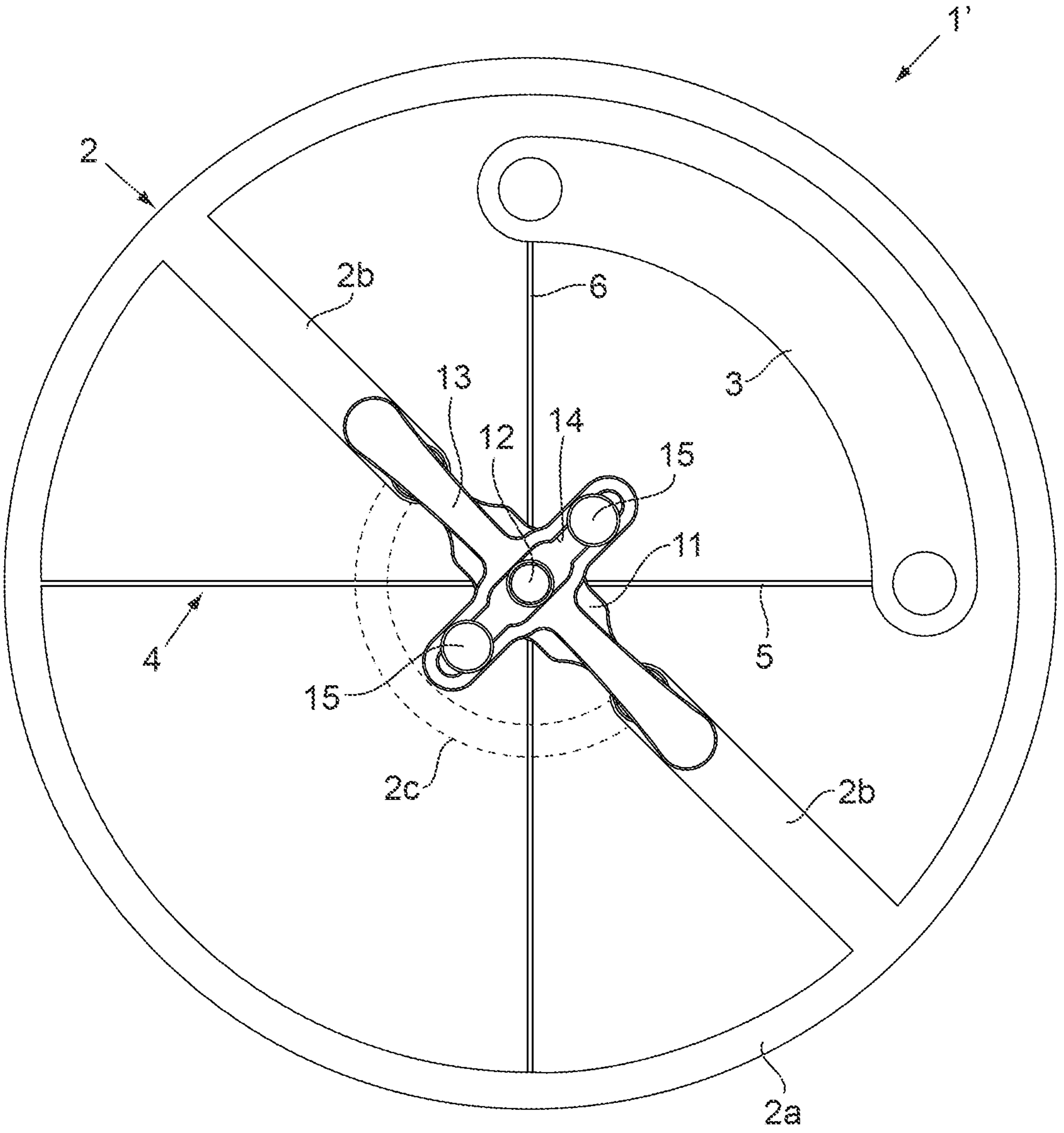
FIGS. 7 and 8 are respectively a plan view from above and a perspective view of a flexure pivot timepiece oscillator according to another embodiment of the invention.
Figure 8:
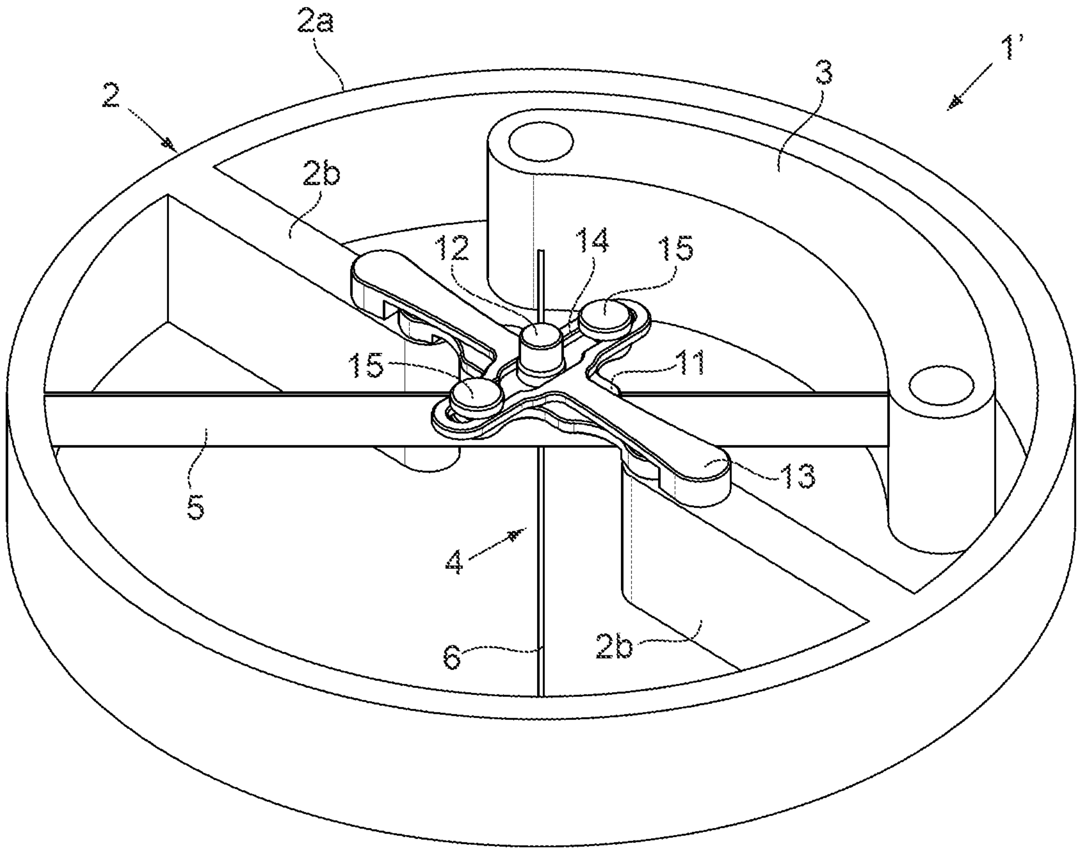

FIGS. 7 and 8 show an oscillator 1' according to another embodiment of the invention in which the device for adjustment of the unbalance is located at the centre of the oscillator in order to modify as little as possible the moment of inertia of the balance 2 and to facilitate the adjustment of this moment of inertia using inertia-blocks carried by the balance 2. Here, the balance 2 comprises a felloe 2*a* and a diametral arm 2*b*. The diametral arm 2*b* is interrupted in its central part in order to allow passage of the strips 5, 6. In a variant illustrated schematically by a dashed line in FIG. 7, the two segments of the diametral arm 2*b* could be connected by a concave connector 2*c* on which the strips 5, 6 would stop. The crossing point of the strips 5, 6 would then be closer to the balance 2 than to the support 3.

In this embodiment of FIGS. 7 and 8, the device for adjustment of the unbalance is mounted on the diametral arm 2*b*. It comprises a support 11 fixed to the upper part of the diametral arm 2*b* and carrying a central stud 12 centred on the virtual axis of rotation of the balance 2. The device for adjustment of the unbalance further comprises an adjustment piece 13 placed on the support 11 and having a slot 14 extending along the axis Y mentioned above, a slot 14 which is traversed by the central stud 12 and by two pegs 15 driven into the support 11. The central stud 12 has a diameter large enough to elastically deform the slot 14 in order to hold the adjustment piece 13 in position by elastic gripping. The two pegs 15 guide the adjustment piece 13 in translation along the axis Y when sufficient force is applied to this piece 13 to adjust the unbalance of the balance 2.

In order to achieve the desired amplitude of oscillation in the timepiece movement in which the oscillator 1, 1' is intended to be used it is possible to play on the dimensions of the mainspring of the movement. It will be possible to choose these dimensions so that the oscillator 1, 1' oscillates at the desired amplitude when the mainspring is fully wound.

The assembly of the balance 2-support 3-flexure pivot 4 of the oscillator 1, 1' can be produced from different materials, e.g. silicon, oxide-coated silicon, glass, sapphire, quartz, a metallic glass, a metal or alloy such as nickel, a nickel alloy, steel, beryllium copper or nickel silver. Depending on the material chosen, it can be obtained by etching (in particular deep reactive ion etching, DRIE), LIGA, milling, electro-erosion, casting or the like. The assembly 2, 3, 4 can be of one piece.

It goes without saying that the present invention can be applied to flexure pivots other than separate crossed strips, in particular non-separate crossed strips and pivots with a remote centre of rotation (RCC).

Furthermore, the flexure pivot 4 could comprise, in addition to the elastic strips 5, 6, additional elastic strips, e.g. strips superimposed on the strips 5, 6 in order to increase its stiffness in the height direction. Generally speaking, in the invention, the axis Y is an axis of symmetry of the flexure pivot and is also an axis of symmetry for the points where the flexure pivot is joined to the balance and for the points where the flexure pivot is joined to the support, in orthogonal projection in a plane perpendicular to the virtual axis of rotation.

The invention claimed is:

1. A method for adjustment of a timepiece oscillator comprising a balance, a support and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for points where the flexure pivot is joined to the balance, the method comprising:

selecting an amplitude of oscillation for the timepiece oscillator; and adjusting an unbalance of the balance so that, in orthogonal projection in said plane, a center of mass of the balance is substantially on the axis of symmetry and at a position distinct from that of the virtual axis of rotation, wherein the position of the virtual axis of rotation is not modified by said adjusting, said position of the center of mass being chosen so as to render minimal a dependency of an oscillation frequency of the timepiece oscillator on an orientation of the timepiece oscillator with respect to the force of gravity for a the selected amplitude of oscillation.

2. The method as claimed in claim 1, wherein the adjusting of the unbalance of the balance is effected, at least in part, using an adjustment device carried by the balance.

3. The method as claimed in claim 2, wherein the adjusting of the unbalance of the balance is effected, at least in part, by displacing at least one piece of the adjustment device along the axis of symmetry.

4. The method as claimed in claim 2, wherein the adjustment of the unbalance of the balance is effected, at least in part, by removing or adding material on the balance.

5. The method as claimed in claim 2, wherein the flexure pivot comprises first and second elastic strips extending in directions which cross each other and are symmetrical to each other with respect to the axis of symmetry in orthogonal projection in said plane perpendicular to the virtual axis of rotation.

6. A timepiece oscillator that can be adjusted by the method as claimed in claim 2, the timepiece oscillator comprising:

a balance, a support, and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for the points where the flexure pivot is joined to the balance, wherein the balance carries at least one unbalance-adjustment piece movable along the axis of symmetry.

7. The method as claimed in claim 3, wherein the adjustment of the unbalance of the balance is effected, at least in part, by removing or adding material on the balance.

8. The method as claimed in claim 3, wherein the flexure pivot comprises first and second elastic strips extending in directions which cross each other and are symmetrical to each other with respect to the axis of symmetry in orthogonal projection in said plane perpendicular to the virtual axis of rotation.

9. A timepiece oscillator that can be adjusted by the method as claimed in claim 3, the timepiece oscillator comprising:

a balance, a support, and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for the points where the flexure pivot is joined to the balance, wherein the balance carries at least one unbalance-adjustment piece movable along the axis of symmetry.

10. The method as claimed in claim 1, wherein the adjusting of the unbalance of the balance is effected, at least in part, by removing or adding material on the balance.

11. The method as claimed in claim 10, wherein the flexure pivot comprises first and second elastic strips extending in directions which cross each other and are symmetrical to each other with respect to the axis of symmetry in orthogonal projection in said plane perpendicular to the virtual axis of rotation.

12. The method as claimed in claim 1, wherein the flexure pivot comprises first and second elastic strips extending in directions which cross each other and are symmetrical to each other with respect to the axis of symmetry in orthogonal projection in said plane perpendicular to the virtual axis of rotation.

13. The method as claimed in claim 12, wherein the flexure pivot has a remote center of rotation.

14. The method as claimed in claim 12, wherein the first and second elastic strips extend in two parallel planes so as to cross each other without contact.

15. The method as claimed in claim 14, wherein, in orthogonal projection in said plane perpendicular to the virtual axis of rotation, a point of crossing of the first and second elastic strips is located at about 87.3% of their length.

16. The method as claimed in claim 14, wherein, in orthogonal projection in said plane perpendicular to the virtual axis of rotation, an angle between the first and second elastic strips is between 68° and 76°.

17. The method of claim 14, wherein, in orthogonal projection in said plane perpendicular to the virtual axis of rotation, an angle between the first and second elastic strips is equal to about 71°.

18. The method as claim 15, wherein, in orthogonal projection in said plane perpendicular to the virtual axis of rotation, the angle between the first and second elastic strips is between 68° and 76°.

19. A timepiece oscillator that can be adjusted by the method as claimed in claim 1, the timepiece oscillator comprising:

a balance, a support, and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for points where the flexure pivot is joined to the balance, wherein the balance carries at least one unbalance-adjustment piece movable along the axis of symmetry.

20. A timepiece movement comprising:

a mainspring; and an oscillator comprising:

a balance;

a support; and a flexure pivot connecting the balance to the support and guiding the balance in rotation with respect to the support about a virtual axis of rotation, the flexure pivot having, in orthogonal projection in a plane perpendicular to the virtual axis of rotation, an axis of symmetry which is also an axis of symmetry for points where the flexure pivot is joined to the balance, wherein the oscillator oscillates at an amplitude of oscillation when the mainspring is fully wound, and wherein, in orthogonal projection in said plane, a center of mass of the balance is substantially on the axis of symmetry and at a position distinct from that of the virtual axis of rotation, said position being the one that renders minimal a dependency of an oscillation frequency of the oscillator on an orientation of the oscillator with respect to the force of gravity at said amplitude of oscillation.

* * * * *